United States Patent
McPheeters et al.

(10) Patent No.: US 10,418,931 B2
(45) Date of Patent: *Sep. 17, 2019

(54) SNAP-IN MOUNTING SYSTEM FOR LAMINATE SOLAR PANELS

(71) Applicant: Sunrun South LLC, San Luis Obispo, CA (US)

(72) Inventors: Greg McPheeters, Santa Clara, CA (US); Ethan Miller, Los Osos, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,239

(22) Filed: Mar. 17, 2015

(65) Prior Publication Data

US 2015/0357964 A1 Dec. 10, 2015

Related U.S. Application Data

(63) Continuation of application No. 13/267,606, filed on Oct. 6, 2011, now Pat. No. 8,984,818.

(60) Provisional application No. 61/390,469, filed on Oct. 6, 2010.

(51) Int. Cl.
| | |
|---|---|
| *E04D 3/18* | (2006.01) |
| *H02S 20/20* | (2014.01) |
| *F24S 25/33* | (2018.01) |
| *F24S 25/632* | (2018.01) |
| *H02S 20/00* | (2014.01) |
| *H02S 30/10* | (2014.01) |
| *F24S 25/60* | (2018.01) |

(52) U.S. Cl.
CPC .............. *H02S 20/20* (2014.12); *F24S 25/33* (2018.05); *F24S 25/632* (2018.05); *H02S 20/00* (2013.01); *H02S 30/10* (2014.12); *F24S 2025/6004* (2018.05); *Y02E 10/47* (2013.01); *Y02E 10/50* (2013.01)

(58) Field of Classification Search
CPC ......... Y02B 10/12; Y02B 10/20; Y02E 10/50; Y02E 10/52
USPC ........ 52/173.3; 126/621, 622, 623; 136/244, 136/251, 259
See application file for complete search history.

(56) References Cited

U.S. PATENT DOCUMENTS

| | | | | |
|---|---|---|---|---|
| 4,738,247 | A * | 4/1988 | Moore | E04D 3/30 126/622 |
| 6,360,491 | B1 * | 3/2002 | Ullman | E04D 13/12 248/156 |
| 8,240,109 | B2 * | 8/2012 | Cusson | F24J 2/465 126/623 |
| 8,272,189 | B2 * | 9/2012 | Chan | F24J 2/5211 52/173.3 |
| 8,413,391 | B2 * | 4/2013 | Seery | F24J 2/5211 126/600 |

(Continued)

*Primary Examiner* — Joshua J Michener
*Assistant Examiner* — James Buckle, Jr.
(74) *Attorney, Agent, or Firm* — Kramer Levin Naftalis & Frankel LLP

(57) ABSTRACT

Snap-in mounting systems for laminate solar panels are provided. The laminate solar panels can include laminate strips that can be snapped into mounting rails. The mounting rails may be coupled to racking rails for structural support and may include locking mechanisms for additional support and theft deterrence. An entire system may include a number of racking rails, mounting rails, and solar panels.

15 Claims, 10 Drawing Sheets

(56) References Cited

U.S. PATENT DOCUMENTS

| | | | | |
|---|---|---|---|---|
| 8,413,944 B2* | 4/2013 | Harberts | ............... | F24J 2/5205 248/500 |
| 8,424,255 B2* | 4/2013 | Lenox | .................... | F24J 2/5245 52/173.3 |
| 2003/0070368 A1* | 4/2003 | Shingleton | ............ | F24J 2/5205 52/173.3 |
| 2003/0101662 A1* | 6/2003 | Ullman | ................... | E04D 13/12 52/27 |
| 2006/0059806 A1* | 3/2006 | Gosling | ............... | E04B 2/7424 52/238.1 |
| 2008/0053009 A1* | 3/2008 | Plaisted | ................ | F24J 2/4614 52/173.3 |
| 2009/0229645 A1* | 9/2009 | Hamilton-Jones | .... | E04H 15/644 135/122 |
| 2012/0073219 A1* | 3/2012 | Zuritis | .................... | F24J 2/523 52/173.3 |
| 2012/0080076 A1* | 4/2012 | Hardikar | ............... | F24J 2/5241 136/251 |
| 2012/0080077 A1* | 4/2012 | Balyon | ................. | F24J 2/5205 136/251 |
| 2013/0008102 A1* | 1/2013 | Bindschedler | ........ | E04D 11/007 52/173.3 |

* cited by examiner

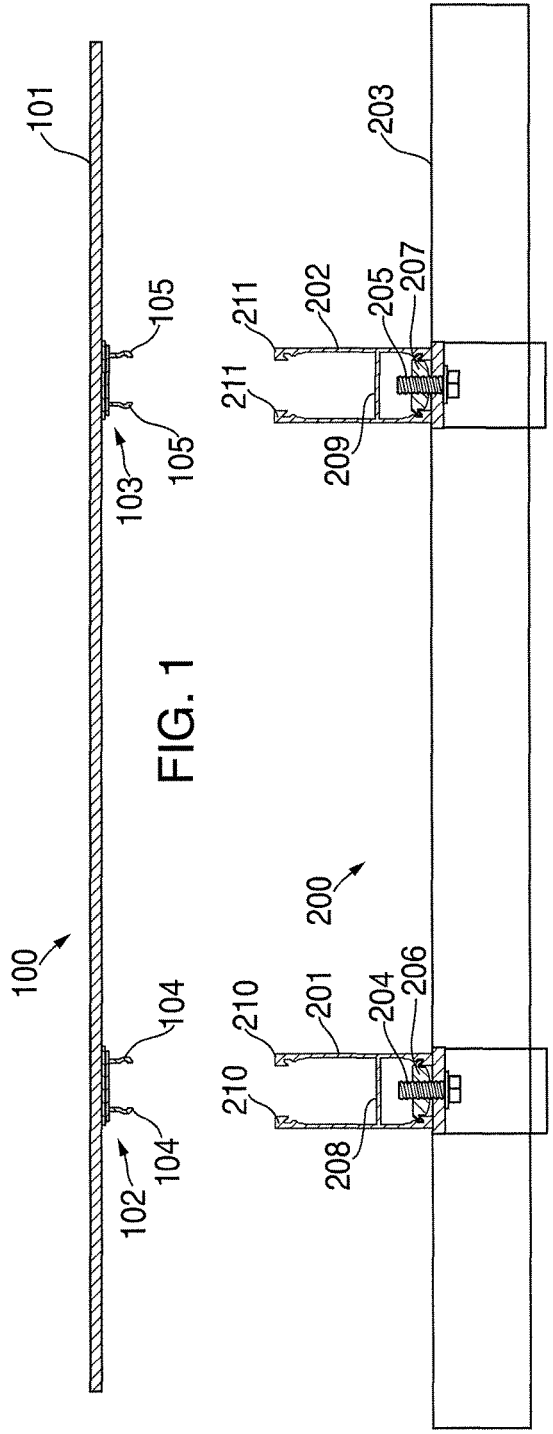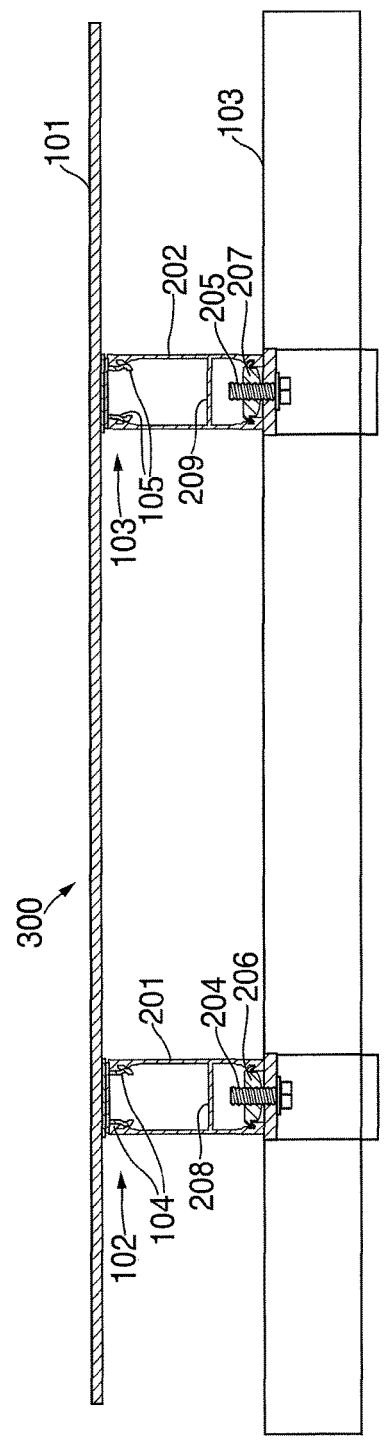

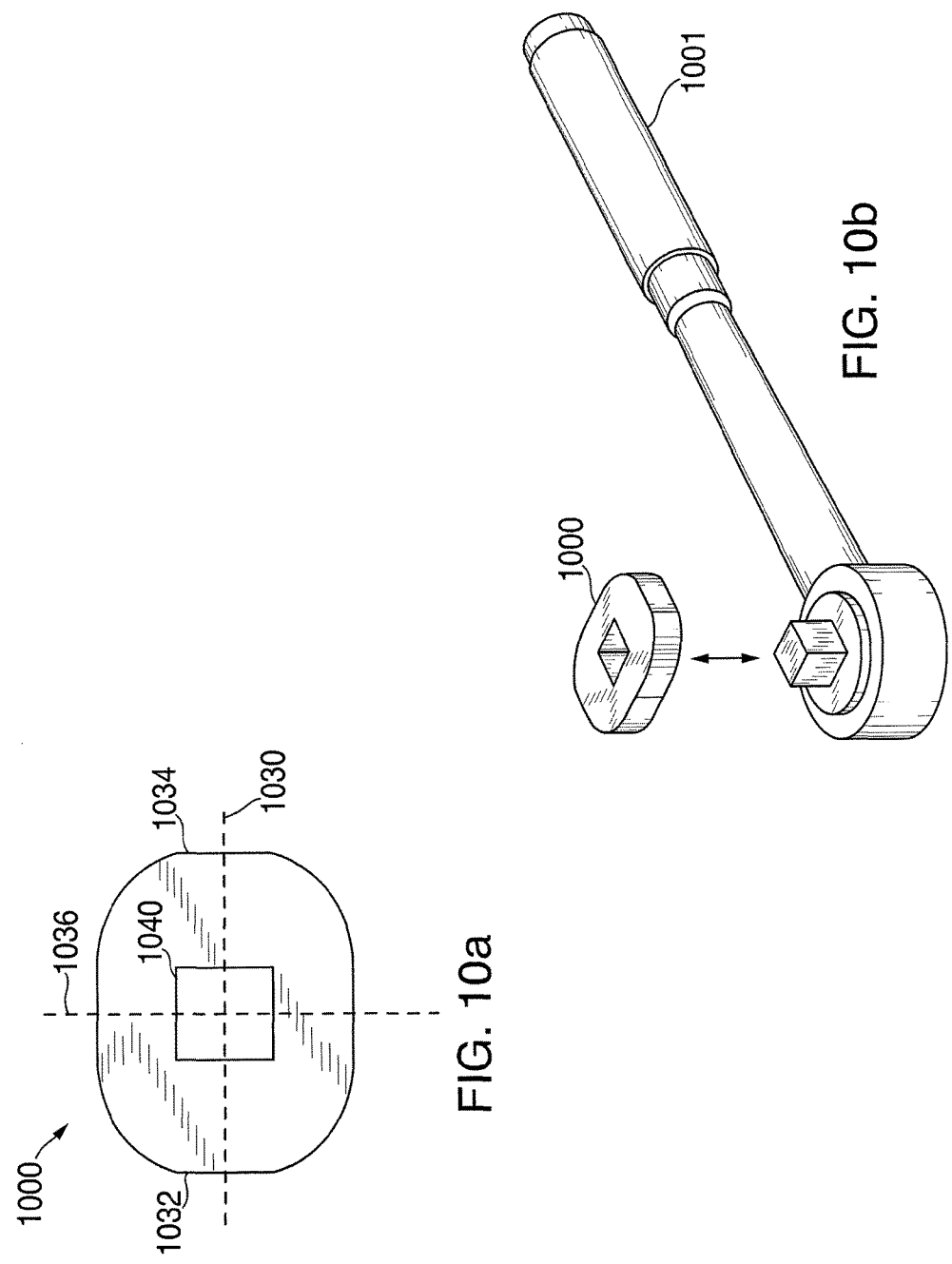

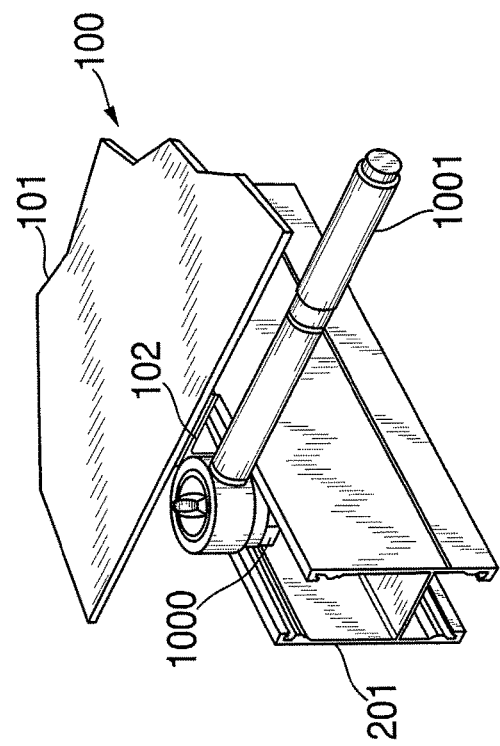
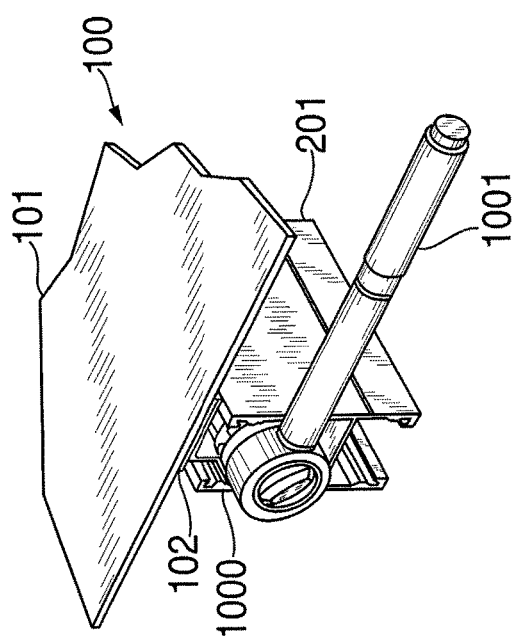
FIG. 11b
FIG. 11a

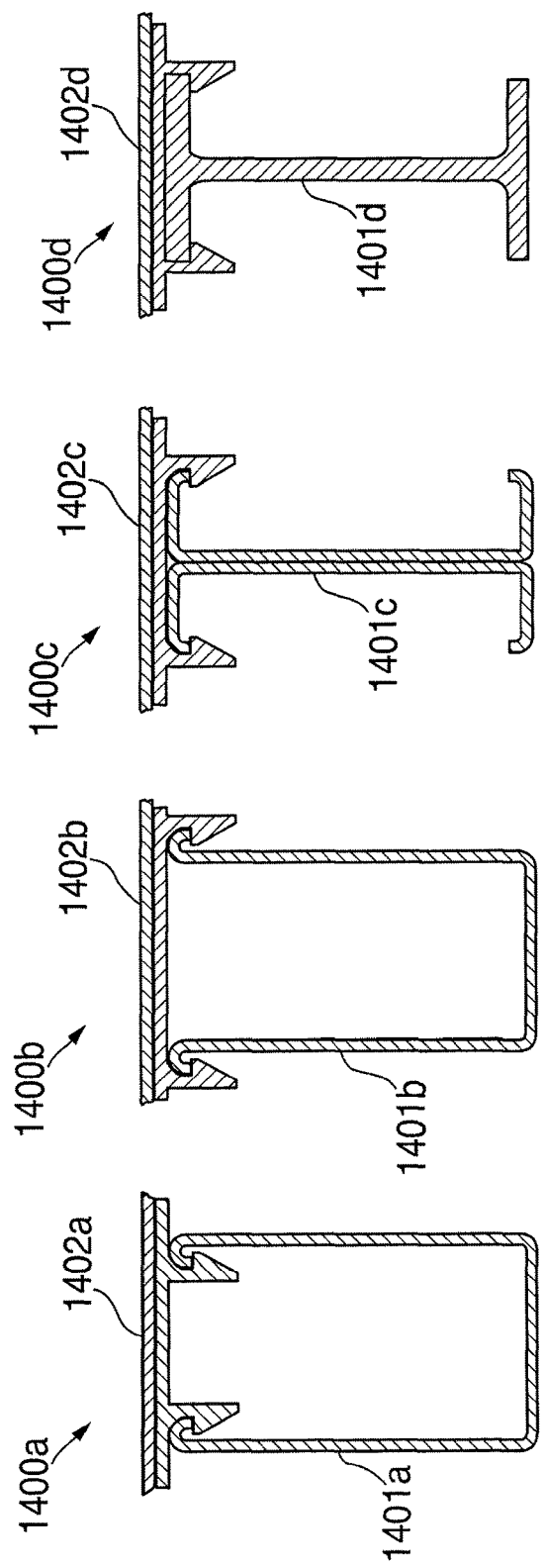

SNAP-IN MOUNTING SYSTEM FOR LAMINATE SOLAR PANELS

CROSS-REFERENCE TO RELATED APPLICATIONS

This application is a continuation of U.S. Patent Application Publication No. 2012/0085394, filed Oct. 6, 2011, entitled "SNAP-IN MOUNTING SYSTEMS FOR LAMINATE SOLAR PANELS," which is incorporated by reference herein in its entirety. This application also claims the benefit of previously filed U.S. Provisional Patent Application No. 61/390,469, filed on Oct. 6, 2010, entitled "SNAP-IN MOUNTING SYSTEM FOR LAMINATE SOLAR PANELS," which is incorporated by reference herein in its entirety.

BACKGROUND

Photovoltaic solar panels, or solar modules, are an increasingly popular means of generating renewable power via the photovoltaic effect. Recently, there has been a wide proliferation of solar projects of all sizes, from small residential installations to large utility scale power production. A major portion of the costs associated with these solar projects comes from the cost of transporting the solar panels from the manufacturer to the project and installing the panels at the project site.

State of the art solar panels may typically include photovoltaic solar cells that may be laminated to sheets of glass and mounted on aluminum frames for structured support. The frames also serve as an attachment point for racking assemblies, but do not typically assist in the generation of electricity. Solar panels mounted on frames are also substantially larger than unmounted solar panels. Mounted solar panels are, therefore, more expensive to transport at least because more shipping containers are required to ship the same number of solar panels.

A significant cost associated with solar power projects arises from paying a trained installer to set up a racking assembly and attach solar panels to the assembly. Typically, solar panels are attached to a racking assembly using a complicated multi-step process involving grounding conductors and clamps and/or bolts, which incurs significant labor and material cost. Reducing the number of components and labor required to install solar panels can drastically reduce installation costs.

As solar technology continues to grow in popularity there is a need to make the installation of solar panels easier, cheaper, and safer.

SUMMARY

Solar panel assemblies can include a "laminate strip" portion that snaps securely into a solar cell mounting rail, obviating the need for solar panel frames and mounting hardware. Laminate strips can be coupled to laminate (frameless) solar panels using any suitable material (e.g., silicone based adhesives, double sided tape, etc.). Snapping solar panels directly to mounting rails can allow an installer to install laminate solar panels without specialized tools and with minimal effort. The mounting rails can also supply stiffening support for laminate solar panels and reinforce the installations against wind and snow loads. Significant cost savings can be realized with this type of installation due to the elimination of mounting hardware, grounding hardware and conductors, the aluminum mounting frames, and the labor and shipping costs associated with each of these elements.

According to some embodiments, mounting rails can include a back-side channel for running cables. A rail cover strip made of short pieces of unattached laminate strips can be used as a "rail cover." These rail covers can be snapped into place on the back-side channel to hold solar panel cables inside the mounting rails.

According to further embodiments, laminate strips can be effective theft deterrents. Once snapped in place, the laminate strips may be difficult to remove without a specialized tool. Theft may also be deterred by placing bolts or clamps on the mounting rails to hold the solar panels in place and/or by using locking hardware requiring a key or specialized tool to remove the panels from the mounting rails.

As used herein, a "cell" can refer to a single piece of crystalline silicon that is doped to generate electricity via the photoelectric effect. Cells may be any shape and size, but are typically round or square and range from 4" to 6" across. The terms "module" and "panel" can interchangeably refer to an assembly or array of cells. Modules may be mounted on a single substrate (e.g., glass) and electrically coupled to other modules (e.g., using wire leads). The term "laminate" can refer to a module or panel with no frame.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIG. 1 is a cross-sectional view of a snap-in laminate solar panel in accordance with some embodiments;

FIG. 2 is a cross-sectional view of a solar panel racking portion in accordance with some embodiments;

FIG. 3 is a cross-sectional view of a portion of an assembled solar panel racking portion in accordance with some embodiments;

FIGS. 10a and 10b show an illustrative specialized tool for removing a laminate strip from a mounting rail in accordance with some embodiments;

FIGS. 11a and 11b are perspective views of a tool extracting a solar panel from a mounting rail in accordance with some embodiments;

FIGS. 14a-14d are several illustrative cross-sectional views of laminate strip-mounting rail combinations in accordance with some embodiments;

DETAILED DESCRIPTION

Figure 4:
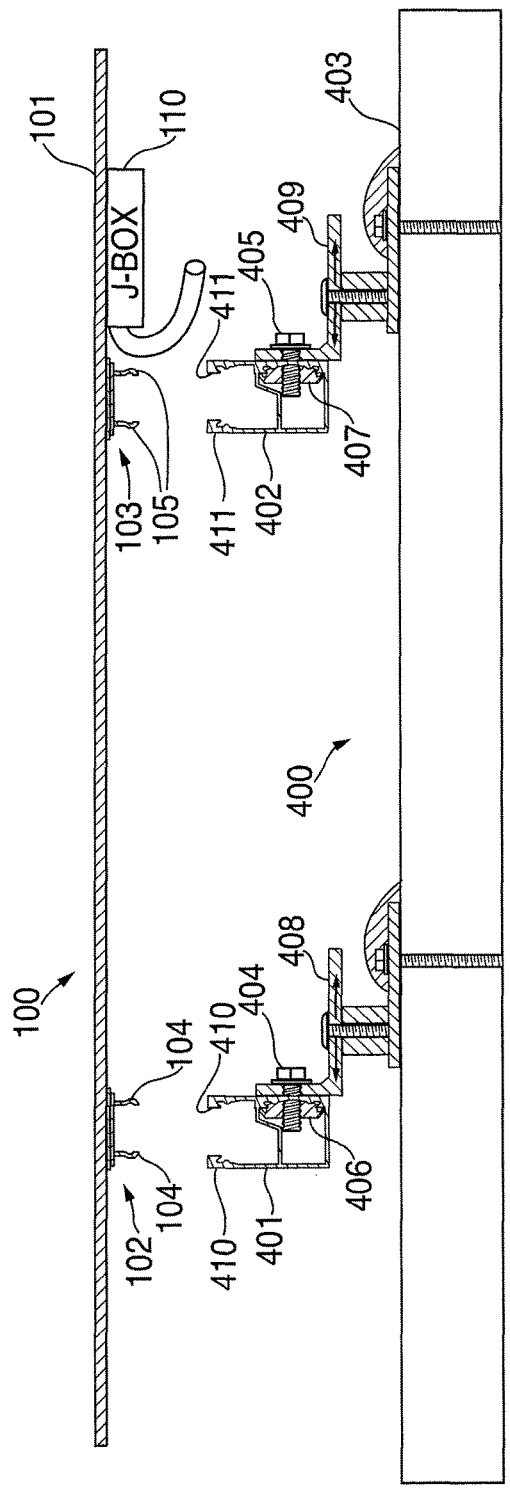
FIG. 4 is a cross-sectional view of a solar panel racking portion in accordance with some embodiments.

FIG. 1 is a cross-sectional view of a snap-in laminate solar panel 100, which can include a laminate solar panel 101 and laminate strips 102,103 in accordance with some embodiments. Laminate solar panel 101 may include an array of photovoltaic solar cells laminated to a suitable substrate (e.g., tempered glass). Solar panel substrates can generally include rigid or semi-rigid transparent materials that may be strong enough to support the solar cells when exposed to environmental elements, including wind, snow, and seismic activity. Solar cells can be laminated to a substrate using a laminating resin (e.g., Ethyl Vinyl Acetate ("EVA")).

Laminate strips 102,103 can be firmly bonded or adhered to laminate solar panel 101 using any suitable adhesive product, such as double sided tape, silicone adhesives (e.g., Dow Corning PV8030), or combinations of more than one adhesive. Laminate strips 102,103 may include any suitable material, including aluminum, steel, plastic, or a composite, although nonconductive materials like plastics and composites may be preferred according to some embodiments. Laminate strips 102,103 can include two extruded portions made of a rigid or semi-rigid material. The extruded portions can include two "notches" at their distal ends, which may be designed to snap into a matching clip in a mounting rail. This feature is described in more detail with regard to FIG. 2 below.

According to some embodiments, laminate strips 102,103 can be mounted to laminate solar panel 101 during the initial manufacture of laminate solar panel 101. In other embodiments, laminate strips 102,103 can be mounted after the initial manufacture of laminate solar panel 101 (e.g., at a separate facility or in the field).

Laminate strips 102,103 can be manufactured using any suitable method. For example, laminate strips 102,103 may be glued or welded together to form the necessary structure to snap into corresponding mounting rail clip structures connected to a racking system. Alternatively, laminate strips and mounting rail clips can be fabricated with corresponding molds in, for example, an injection molding process. Additionally, one skilled in the art will appreciate that similar techniques can be used to fabricate laminate strips 102,103.

Although laminate solar panels are generally discussed throughout, framed solar panels may be substituted for laminate solar panels according to some embodiments. A framed solar panel can include a laminate solar panel (e.g., laminate solar panel 101 of FIG. 1) mounted to a suitable frame. For example, the frame can be an aluminum mounting frame as described above. Framed solar panels according to these embodiments can include mounting strips similar to laminate mounting strips 102,103. The mounting strips may be coupled to the framed solar panels in any suitable manner. For example, the mounting strips may be bonded to the frames with an adhesive, attached with fasteners (e.g., bolts), and/or welded. In some embodiments, mounting strips may be slid or snapped into corresponding grooves in a solar panel mounting frame.

FIG. 2 is a cross-sectional view of a solar panel racking portion 200 in accordance with some embodiments. Solar panel racking portion 200 can include mounting rails 201, 202, which can be mounted to a pipe 203 with bolts 204,205 and channel nuts 206,207. Mounting rails 201,202 may include any suitable material, including aluminum, steel, plastic, or composite. Sidewall portions of mounting rails 201,202 can include respective clip structures 210,211 at their distal ends that can be configured to receive the notch portions of, for example, laminate strips 102,103 (e.g., respective notched ends 104,105 of laminate strips 102,103 of FIG. 1). The sidewall portions of mounting rails 201,202 can be held together and stabilized with crossbars 208,209. According to some embodiments, the sidewalls and crossbars 208,209 and can be integrally formed. In other embodiments, however, crossbars 208,209 can be coupled to the sidewalls of mounting rails 201,202 with any suitable fasteners (e.g., clips, bolts, etc.). Solar panel racking portion 200 may be part of a larger structure. For example, solar panel racking portion 200 may be part of a large racking system with multiple solar panels and mounting rails.

According to some embodiments, mounting rails 201,202 can be rigid, but flexible enough to bend without permanently deforming any part of solar panel racking portion 200 or laminate solar panels (e.g., laminate solar panel 101 of FIG. 1) mounted thereto. Pipe 203 may include any suitable material. One skilled in the art can appreciate that pipe 203 may be replaced by any suitable alternative, such as an aluminum or steel roll form. Channel nuts 206,207 may also be replaced by alternatives, including threaded inserts or washers.

FIG. 3 is a cross-sectional view of a portion of an assembled solar panel racking portion 300 in accordance with some embodiments. In particular, solar panel racking portion 300 shows snap-in laminate solar panel 100 (FIG. 1) snapped into mounting rails 201,202 of solar panel racking portion 200 (FIG. 2) with laminate strips 102,103, respectively. Assembly of solar panel racking portion 300 can begin with aligning laminate strips 102,103 with mounting rails 201,202. For example, distal, notched ends 104,105 of laminate strips 102,103 can then be inserted into clip structures 210,211 at the distal ends of mounting rails 201,202, and pressure can be exerted on snap-in laminate solar panel 100 to snap it into place. After assembly, snap-in laminate solar panel 100 can be securely fastened to solar panel racking portion 200 by virtue of notched ends 104,105 of laminate strips 102,103 pushing against clip structures 210, 211 of mounting rails 201,202.

FIG. 4 is a cross-sectional view of a solar panel racking portion 400 in accordance with some embodiments. Solar panel racking portion 400 can include mounting rails 401, 402, which can be coupled to a surface 403 with bolts 404,405, channel nuts 406,407, L-Feet 408,409, and mounting fasteners 412,413. Surface 403 can be any surface suitable for installing solar panels. For example, surface 403 may be the roof of a building. Mounting rails 401,402 can each include two openings, which may be perpendicular to one another. The first opening can be at the distal ends of mounting rails 401,402 and can be configured to receive laminate strips 102,103 with clip structures 410,411 as described above with respect to FIG. 3.

Channel nuts 406,407 can be located inside the second opening in mounting rails 401,402 to accept bolts 404,405. Bolts 404,405 can be inserted through slots in L-Feet 408,409 to secure L-Feet 408,409 adjacent to the second openings of mounting rails 401,402. L-Feet 408,409 can be adjusted to provide tolerance for rail alignment during installation and may be coupled to surface 403 with fasteners 412,413.

A junction box or "j-box" 110 may house one or more electrical connectors that may join wires that can be electrically coupled to one or more of the solar cells of laminate solar panel 101. A cable 112 can include one or more conductors leading from the one or more electrical connectors inside junction box 110 and may run, according to some embodiments, to a battery, electrical grid, or other suitable load.

Figure 5:
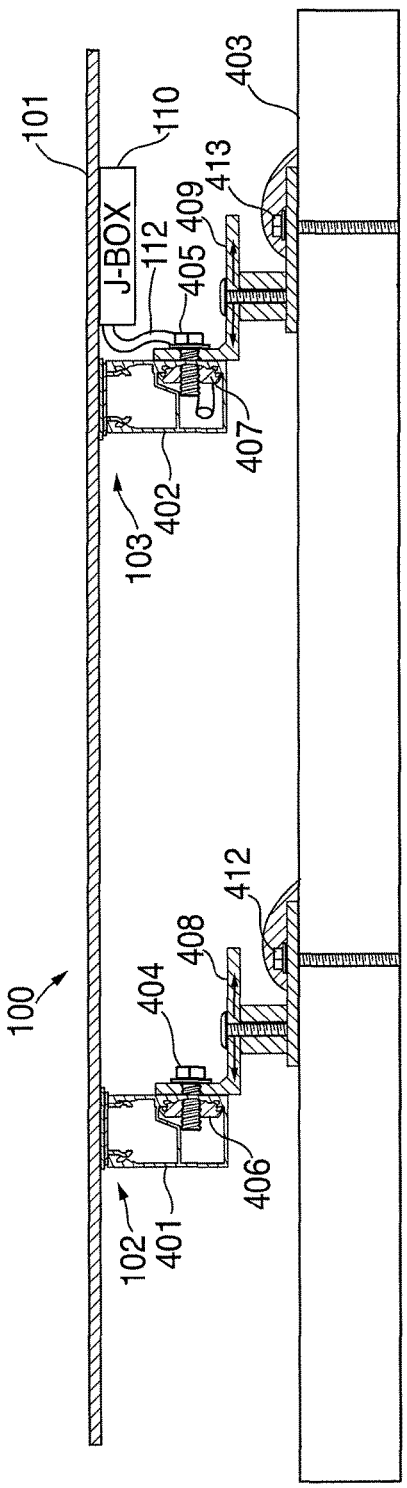
FIG. 5 is a cross-sectional view of an assembled solar panel racking portion in accordance with some embodiments.

FIG. 5 is a cross-sectional view of an assembled solar panel racking portion 500, which may include snap-in laminate solar panel 100 snapped into solar panel racking portion 400 in accordance with some embodiments. Assembly of assembled solar panel racking portion 500 may be similar to the assembly of assembled solar panel racking portion 300 of FIG. 3. As shown in FIG. 5, cable 112 can enter mounting rail 402 through its second opening. In these embodiments, mounting rail 402 can provide cable management and protect cable 112 from the environment and unnecessary stresses that may ultimately damage cable 112 or one or more electrical connections inside junction box 110

Figure 6:
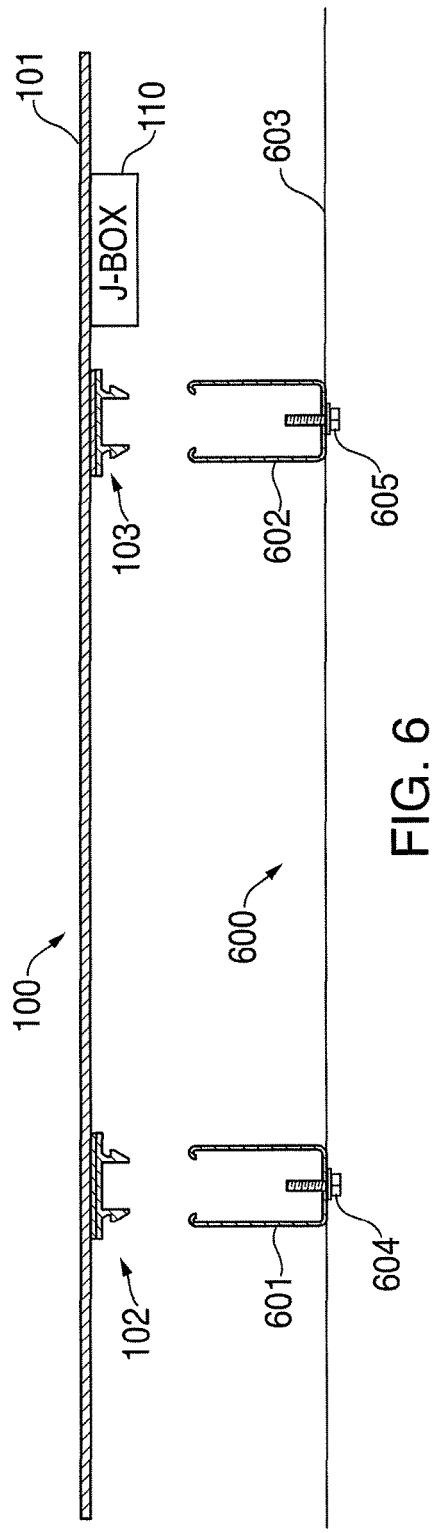
FIG. 6 is a cross-sectional view of a solar panel racking portion in accordance with some embodiments.

FIG. 6 is a cross-sectional view of a solar panel racking portion 600 in accordance with some embodiments. Solar panel racking portion 600 can include mounting rails 601, 602, which may be mounted to a racking rail 603 with mounting hardware 604,605. As shown in FIG. 6, mounting rails 601,602 can be roll formed rails, which may include any suitable material (e.g., steel). The distal ends of mounting rails 601,602 can be configured (e.g., during the roll forming process) to snap together with the extruded portions of laminate strips 102,103 (e.g., notched ends 104,105). According to some embodiments, racking rail 603 can also be a roll formed rail structure. Alternatively, racking rail 603 can be a pipe, such as pipe 203 of FIG. 2. Mounting rails 601,602 can be coupled to racking rail 603 with self-drilling screws (e.g., Tek™ screws), or any other suitable mounting hardware 604,605.

In some embodiments, laminate strips 102,103 can include plastic, a composite, or other suitable rigid, nonconductive material. Because nonconductive materials like plastic do not have to be grounded, laminate strips 102,103 can be snapped into mounting rails 601,602 without impacting system grounding requirements, thereby simplifying system design and installation.

Figure 7:
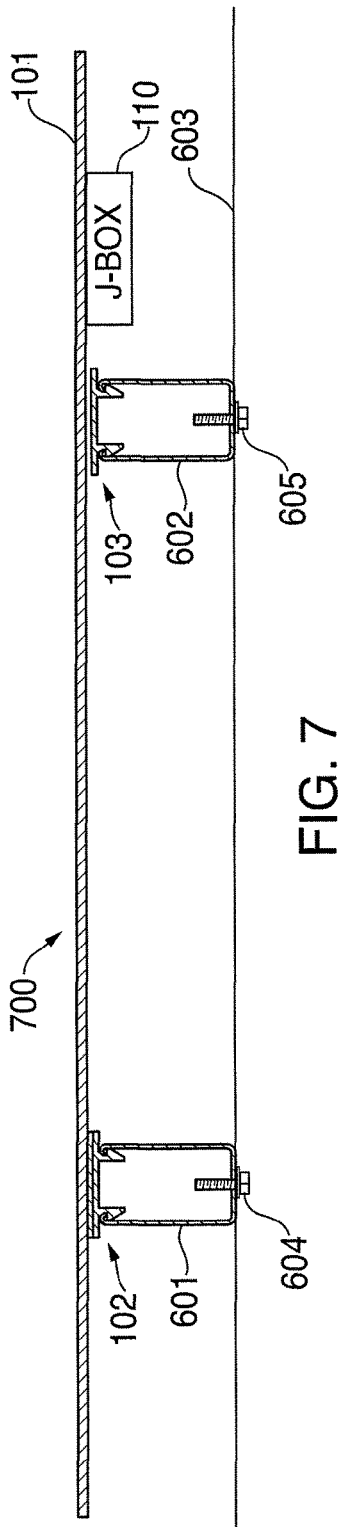
FIG. 7 is a cross-sectional view of assembled solar panel racking portion in accordance with some embodiments.

FIG. 7 is a cross-sectional view of an assembled solar panel racking portion 700 with snap-in laminate solar panel 100 snapped into solar panel racking portion 500 in accordance with some embodiments. Assembly of assembled solar panel racking portion 700 may be similar to the assembly of assembled solar panel racking portion 300 of FIG. 3.

Figure 8:
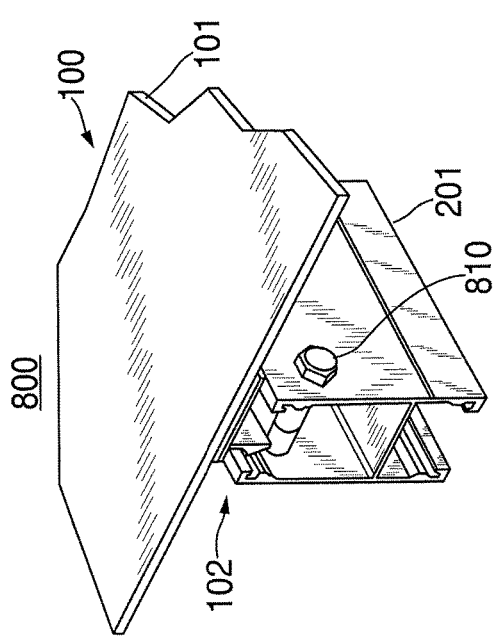
FIG. 8 is a perspective view of an illustrative theft deterrent locking mechanism in accordance with some embodiments.

FIG. 8 shows an illustrative theft deterrent locking mechanism 800 in accordance with some embodiments. Theft deterrent locking mechanism 800 can be used to lock snap-in laminate solar panel 100, which may include laminate solar panel 101 and laminate strip 102, to mounting rail 201 using a bolt 810.

Bolt 810 can extend across mounting rail 201 and hold the sidewall portions together with either a locking nut (not shown) or threaded inserts in the sidewalls. Bolt 810 can be rotated to tighten the sidewalls of mounting rail 201 against the notch portion of laminate strip 102. In some embodiments, bolt 810 can be a locking bolt that cannot be removed without a keyed driver bit, a key, or a combination for the lock. As shown, bolt 801 may pass below laminate strip 102. However, in some embodiments, bolt 810 can pass through laminate strip 102 to prevent snap-in laminate solar panel 100 from sliding in mounting rail 201, especially in the presence of extreme loads (e.g., from wind, snow, and/or seismic forces).

Figure 9A:
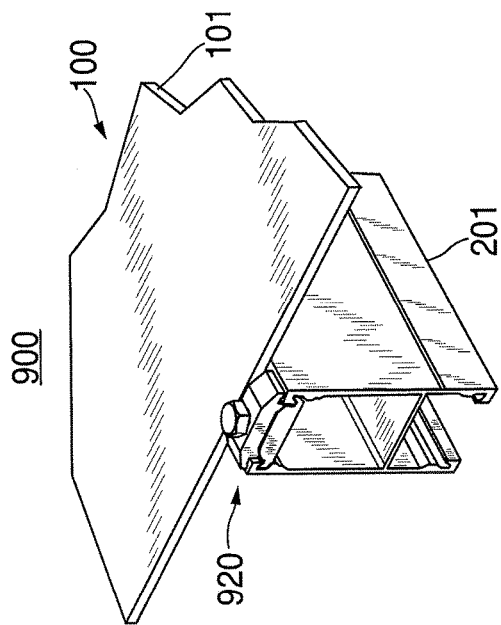
FIGS. 9a and 9b are perspective views of another illustrative theft deterrent locking mechanism in accordance with some embodiments.

FIG. 9a shows an illustrative theft deterrent locking mechanism 900 in accordance with some embodiments. Theft deterrent locking mechanism 900 can be used to lock snap-in laminate solar panel 100 to mounting rail 201 using a clamping rail lock 920.

Figure 9B:
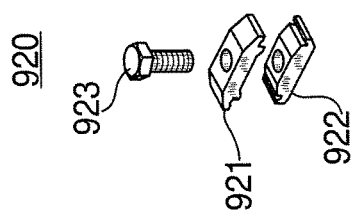

As shown in FIG. 9b, clamping rail lock 920 can include a top member 921, which can be structured to fit flush on top of the distal end of mounting rail 201, and a bottom member 922, which can be structured to slide into the clip portion (e.g., clip structure 210) of the distal end of mounting rail 201. Top member 921 and bottom member 922 can be tightened together with a bolt 923 to prevent clamping rail lock 920 from sliding, or otherwise moving, in mounting rail 201. Clamping rail lock 920 can abut an edge of laminate solar panel 101 to prevent it from sliding in mounting rail 201, especially in the presence of extreme loads. According to some embodiments, bolt 923 can be a locking bolt.

FIGS. 10a and 10b show an illustrative specialized tool 1000 for removing a laminate strip from a mounting rail. Tool 1000 can be shaped like an oval with flattened edges 1032,1034 perpendicular to a major axis 1030. The width of tool 1000 along a minor axis 1036 can be smaller than the width of the opening in a mounting rail, which may allow tool 1000 to be inserted into the mounting rail when properly oriented. According to some embodiments, tool 1000 can include a hole 1040 to be used with, for example, a standard square-drive wrench 1001. Tool 1000 may also be made with a dedicated handle.

FIGS. 11a and 11b show illustrative views of tool 1000 extracting laminate solar panel 101 from mounting rail 201 in accordance with some embodiments. Tool 1000 can be inserted into mounting rail 201 and rotated to press against the inner surfaces of the sidewalls of mounting rail 201. As tool 1000 is rotated, the sidewalls of mounting rail 201 can flex outward, allowing the laminate strip of snap-in laminate solar panel 100 to be extracted from mounting rail 201. The flat edges (i.e., flattened edges 1032,1034) of tool 1000 can steadily hold the sidewalls of mounting rail 201 apart while the laminate strip is removed.

FIG. 11a shows tool 1000 inserted into the side of mounting rail 201. Pushing up or down on wrench 1001 may flex the sidewalls of mounting rail 201 to unclip the laminate strip of snap-in laminate solar panel 100. Similarly, FIG. 11b shows tool 1000 inserted into the top of mounting rail 201. Rotating wrench 1001 can flex the sidewalls of mounting rail 201 to unclip the laminate strip.

Figure 12:
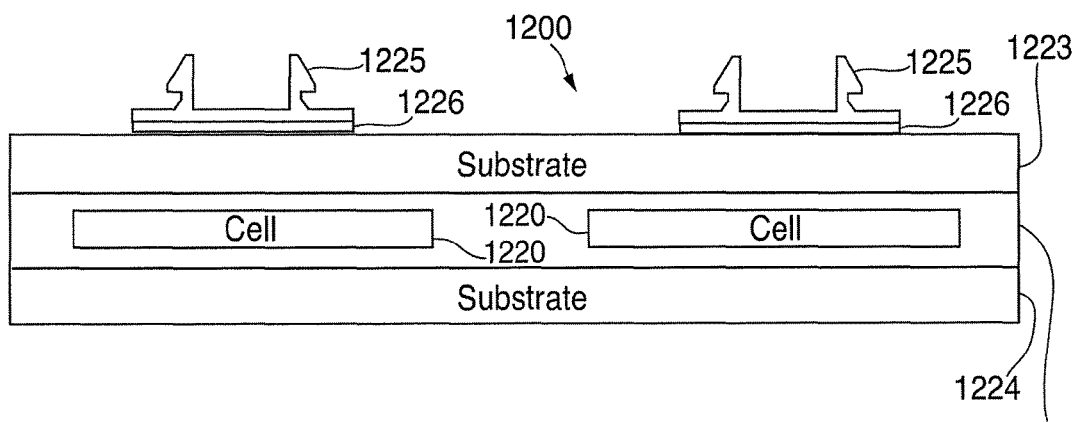
FIG. 12 is a detailed cross-sectional view of a solar panel in accordance with some embodiments.

FIG. 12 shows a detailed cross-sectional view of a solar panel 1200 in accordance with some embodiments. Solar panel 1200 can include cells 1220,1221, substrate 1233 (e.g., tempered glass), substrate 1224 (e.g., tempered glass or DuPont™ Tedlar®), laminate strips 1225, laminate region 1224, and bonding regions 1226. Solar panel 1200 can be similar to, for example, snap-in laminate solar panel 100 of FIG. 1.

Laminate region 1222 can include a laminate material (e.g., EVA) that encapsulates cells 1220,1221 and bonds them to substrates 1223 and 1224. According to some embodiments, the surfaces of solar panel layers 1220, 1221, 1223, and 1224 can include scoring, grooves, or notches to increase the surface area between the layers as increased surface area may generally increase the strength of the bond. The thickness of laminate region 1222 and the amount of scoring of solar panel layers 1220, 1221, 1223, and 1224 can depend on design load requirements, solar panel dimensions, the materials used, and the like. Solar cell efficiency concerns may also determine the optimal amount of scoring, particularly for the surfaces of cells 1220 and 1221 proximal to substrate 1223. For example, distressing the surface of cells 1220 and 1221 may result in reduced efficiency due to recombination of carriers at the surface.

Bonding regions 1226 can incorporate any suitable adhesive product, such as double sided tape, silicone adhesives (e.g., Dow Corning PV8030), or combinations of more than one adhesive to firmly bond laminate strips 1225 to substrate 1224. Laminate strips 1225 may also include scoring, grooves, or notches to improve strength of the bond.

Figure 13A:
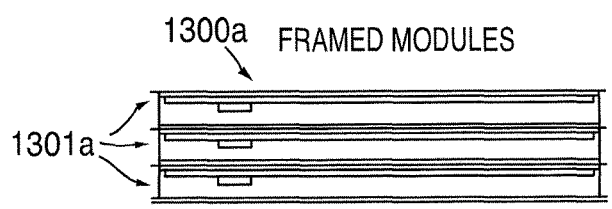
FIGS. 13a and 13b are illustrative diagrams of solar panel stacks in accordance with some embodiments.
Figure 13B:
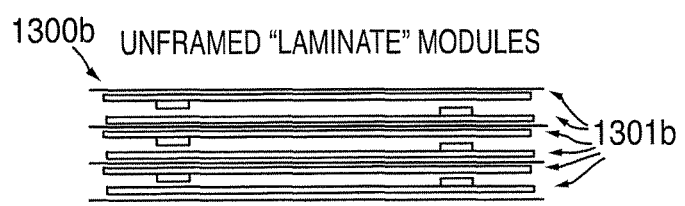

FIGS. 13*a* and 13*b* are illustrative diagrams of solar panel stacks in accordance with some embodiments. Solar panels may be stacked in these configurations for shipment from the manufacturer to the project site, for example. FIG. 13*a* shows a stack 1300*a* of typical aluminum-framed solar panels 1301*a*. The frames may significantly increase the size and weight of each solar panel, which may result in increased shipping costs. FIG. 13*b* shows a stack 1300*b* of laminate solar panels 1301*b* according to embodiments disclosed herein. The solar panels can be unframed snap-in laminate panels (e.g., snap-in laminate solar panel 100 of FIG. 1). Besides being thinner than typical framed solar panels, solar panels in stack 1300*b* can be stacked in a nested manner, which can further increase the number of solar panels that can be packed in a fixed volume.

FIGS. 14*a*-14*d* show several illustrative cross-sectional views of various laminate-strip mounting-rail combinations 1400*a*-1400*d* in accordance with some embodiments. Combinations 1400*a*-1400*d* represent exemplary embodiments, and one skilled in the art can appreciate that similar laminate-strip mounting-rail combinations explicitly fall within the scope of the embodiments disclosed herein. Combination 1400*a* may include a laminate strip 1402*a* that may be coupled to a mounting rail 1401*a*. Inwardly bending clip structures may be formed at the distal ends of the sidewalls of mounting rail 1401 to engage the outwardly facing notches of the extruded portions of laminate strip 1402*a*. Mounting rail 1401*a* can be formed by any suitable process (e.g., roll forming or extrusion).

Combination 1400*b* may include a laminate strip 1402*b* that may be coupled to a mounting rail 1401*b*. Outwardly bending clip structures may be formed at the distal ends of the sidewalls of mounting rail 1401*b* to engage the inwardly facing notches of the extruded portions of laminate strip 1402*a*. Mounting rail 1401*a* can be formed by any suitable process (e.g., roll forming or extrusion).

Combination 1400*c* may include a laminate strip 1402*c* that may be coupled to a mounting rail 1401*c*. Mounting rail 1401*c* can include two individual outwardly facing U-shaped rails coupled together. The distal end can be configured to correspond to the shape of, and engage the inner surface of the extruded portions of laminate strip 1402*c*, which can include inwardly facing notches. The individual rails of mounting rail 1401*a* can be formed by any suitable process and coupled together. For example, the individual rails may roll formed and joined together using any suitable process (e.g., welding, inline punching, or using fasteners, such as rivets or pins).

Combination 1400*d* may include a laminate strip 1402*d* that may be coupled to a mounting rail 1401*d*. Mounting rail 1401*d* can be an I-beam with a distal flange end that may be configured to engage an inner surface of one or more extruded portions of laminate strip 1402*d*, which can include inwardly facing notches. The I-beam, or similar shape, could be extruded from aluminum or manufactured using other materials, including composite or steel.

According to some embodiments, snap-in laminate solar panels can include any number of laminate strips, and the strips may be of any suitable length. Moreover, in some embodiments, laminate strips can be coupled to a laminate solar panel in any suitable orientation. The particular configuration chosen may depend on cost, ease of installation, anticipated loads (e.g., wind and snow loads), or any other suitable factor or combination of factors. Two exemplary embodiments are discussed below with reference to FIGS. 15*a*, 15*b*, 16*a*, and 16*b*.

Figure 15A:
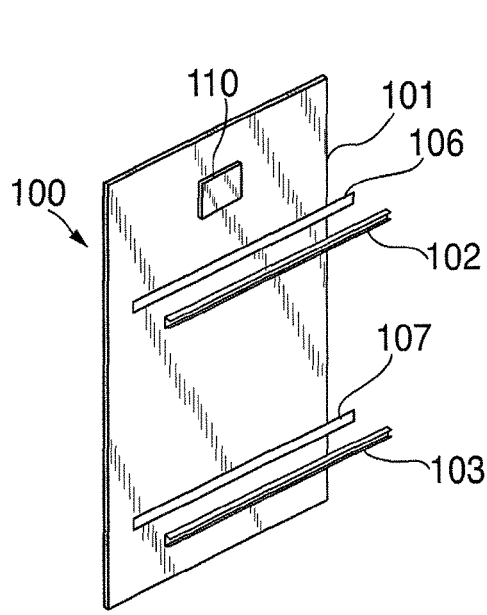
FIGS. 15a and 15b are rear perspective views of a snap-in laminate solar panel in accordance with some embodiments.
Figure 15B:
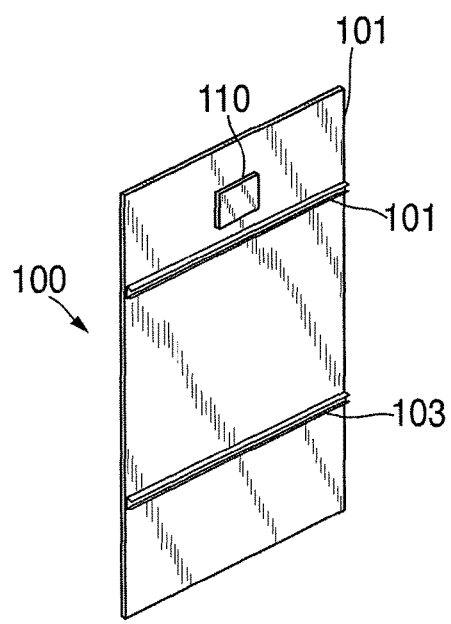

FIG. 15*a* is an exploded rear perspective view of a snap-in laminate solar panel 100 in accordance with some embodiments. In particular, snap-in laminate solar panel 100 can correspond to snap-in laminate solar panel 100 of FIG. 1. Snap-in laminate solar panel 100 can include laminate solar panel 101, laminate strips 102,103, and junction box 110. Laminate strips 102,103 can be coupled to laminate solar panel 101 with adhesive strips 106,107. Adhesive strips 106,107 may be suitable adhesive product, such as double sided tape, silicone adhesives (e.g., Dow Corning PV8030), or combinations of more than one adhesive. FIG. 15*b* is a rear perspective view of snap-in laminate solar panel 100 in accordance with some embodiments. As shown, snap-in laminate solar panel 100 can include two laminate strips 102,103 that extend across the full width of laminate solar panel 101.

Figure 16A:
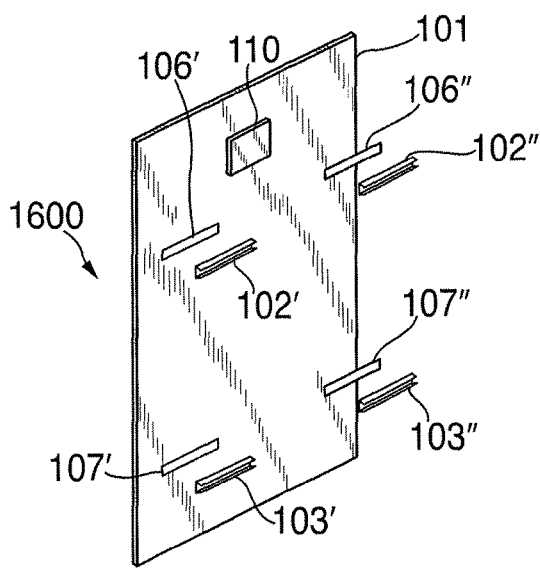
FIGS. 16a and 16b are rear perspective views of a snap-in laminate solar panel in accordance with some other embodiments.
Figure 16B:
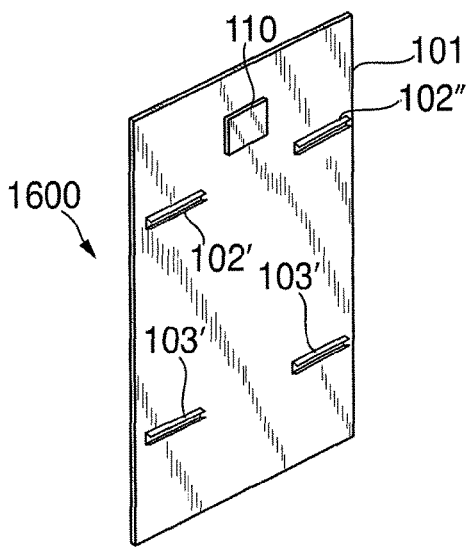

FIG. 16*a* is an exploded rear perspective view of a snap-in laminate solar panel 1600 in accordance with some embodiments. Snap-in laminate solar panel 1600 can include laminate solar panel 101, laminate strips 102', 102", 103', and 103", and junction box 110. Laminate strips 102', 102", 103', and 103" can be coupled to laminate solar panel 101 with adhesive strips 106', 106", 107', and 107", respectively. FIG. 16*b* is a rear perspective view of snap-in laminate solar panel 1600 in accordance with some embodiments. As shown, snap-in laminate solar panel 1600 can include laminate strips 102', 102", 103', and 103" that each extends part-way across the full width of laminate solar panel 101.

Figure 17:
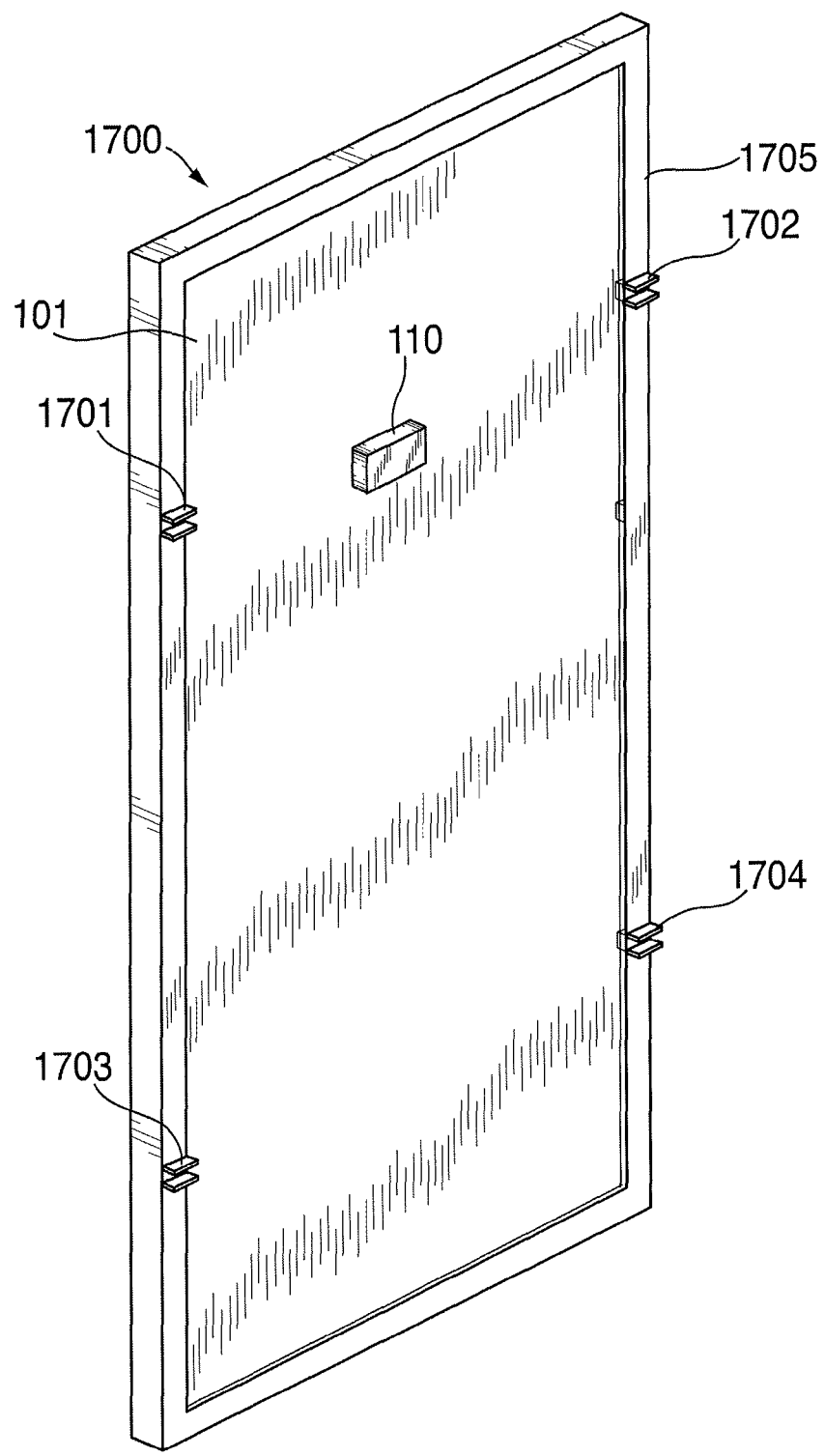
FIG. 17 is a rear perspective view of a framed solar panel 1700 in accordance with some embodiments.

FIG. 17 is a rear perspective view of a framed solar panel 1700 in accordance with some embodiments. Framed solar panel 1700 can include laminate solar panel 101, j-box 110, mounting clips 1701, 1702, 1703, and 1704, and frame 1705. Laminate solar panel 101 can be mounted in frame 1705 in any suitable manner. In some embodiments, laminate solar panel 101 can be fastened to frame 1705 with fasteners and/or adhesives. In other embodiments, frame 1705 can be assembled around laminate solar panel 101 such that the panel cannot be removed. Frame 1705 can include any suitable material (e.g., aluminum, plastic, or a composite).

Mounting clips 1701, 1702, 1703, and 1704 can be coupled to frame 1705 in any suitable manner and may serve the same purpose, for example, as laminate strips 101,102 of FIG. 1. That is, the mounting clips can be configured to snap into, or otherwise couple to, corresponding mounting rails. In some embodiments, mounting clips 1701, 1702, 1703, and 1704 can be formed integrally with the rest of frame 1705. While four mounting clips are shown in FIG. 17, a frame according to some embodiments can include any suitable number (e.g., 2, 4, 6, 8, etc.) of mounting clips.

While there have been described snap-in mounting systems for laminate solar panels, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements.

The described embodiments of the invention are presented for the purpose of illustration and not of limitation.

What is claimed is:

1. A solar panel racking system, comprising:
    a solar module, comprising:
        a laminate solar panel; and
        at least one laminate strip adhered to the laminate solar panel, the at least one laminate strip comprising a plurality of portions extending away from the laminate solar panel, wherein a distal end of each one of the plurality of portions comprises a notch, wherein the notches of the at least one laminate strip extend in different directions, and wherein the at least one laminate strip is adhered to the laminate solar panel at a proximal side of the at least one laminate strip, the proximal side comprising a roughened surface;
    at least one mounting rail having two sidewalls, wherein each of the two sidewalls is configured to detachably couple to one of the notches; and
    a locking mechanism, wherein the locking mechanism comprises a fastener configured to apply a compressive stress to the two sidewalls of the at least one mounting rail, and wherein the compressive stress locks the at least one laminate strip to the at least one mounting rail.

2. The solar panel racking system of claim 1, wherein the fastener comprises a bolt.

3. The solar panel racking system of claim 1, wherein the fastener comprises a locking bolt that requires at least one of a key, a keyed driver bit, and a combination to unlock the locking bolt.

4. A solar panel racking system, comprising:
    a solar module, comprising:
        a laminate solar panel; and
        at least one laminate strip adhered to the laminate solar panel, the at least one laminate strip comprising a plurality of portions extending away from the laminate solar panel, wherein a distal end of each one of the plurality of portions comprises a notch, wherein the notches of the at least one laminate strip extend in different directions, and wherein the at least one laminate strip is adhered to the laminate solar panel at a proximal side of the at least one laminate strip, the proximal side comprising a roughened surface;
    at least one mounting rail having two sidewalls, wherein each of the two sidewalls is configured to detachably couple to one of the notches; and
    a locking mechanism, wherein the locking mechanism comprises a clamping rail lock coupled to the distal ends of the two sidewalls of the at least one mounting rail.

5. A solar panel racking system, comprising:
    a solar module, comprising:
        a laminate solar panel; and
        at least one laminate strip adhered to the laminate solar panel, the at least one laminate strip comprising a plurality of portions extending away from the laminate solar panel, wherein a distal end of each one of the plurality of portions comprises a notch, wherein the notches of the at least one laminate strip extend in different directions, and wherein the at least one laminate strip is adhered to the laminate solar panel at a proximal side of the at least one laminate strip, the proximal side comprising a roughened surface;
    at least one mounting rail having two sidewalls, wherein each of the two sidewalls is configured to detachably couple to one of the notches; and
    a racking rail coupled to a proximal end of the at least one mounting rail.

6. The solar panel racking system of claim 5, wherein the racking rail is coupled to the proximal end of the at least one mounting rail with a self-drilling screw.

7. The solar panel racking system of claim 5, wherein the racking rail comprises a pipe.

8. The solar panel racking system of claim 5, wherein the racking rail comprises a roll formed structure.

9. A solar panel racking system, comprising:
    a plurality of racking rails;
    a plurality of mounting rails, wherein a proximal end of each mounting rail is coupled to a respective racking rail;
    a plurality of laminate strips; and
    a plurality of laminate solar modules, wherein each laminate solar module is adhered to a proximal end of a respective laminate strip, wherein each laminate strip comprises a plurality of portions extending away from the respective laminate solar module, wherein a distal end of each of the plurality of portions comprises a notch, wherein the notches of each laminate strip extend in different directions, and wherein a distal end of each laminate strip is configured to couple to a distal end of a respective mounting rail.

10. The solar panel racking system of claim 9, wherein at least one racking rail comprises at least one of a pipe and a roll formed structure.

11. The solar panel racking system of claim 9, wherein at least one mounting rail is formed by at least one of an extrusion process and a roll forming process.

12. The solar panel racking system of claim 9, wherein the distal end of each mounting rail comprises a clip structure, and wherein the notches of each laminate strip are configured to be coupled to the clip structure of a respective mounting rail.

13. The solar panel racking system of claim 12, wherein the notches of the plurality of laminate strips and the corresponding clip structures of the plurality of mounting rails are formed together from corresponding molds in an injection molding process.

14. The solar panel racking system of claim 9, wherein each mounting rail comprises two sidewalls, and wherein the two sidewalls of a particular mounting rail are configured to be forced apart to allow a particular laminate strip to be decoupled from the particular mounting rail.

15. The solar panel racking system of claim 14, wherein the two sidewalls of the particular mounting rail are configured to be forced apart by a tool, wherein the tool comprises an oval shape with flat edges perpendicular to a major axis of the tool, and wherein the length of a minor axis of the tool is less than the space between the two sidewalls of the particular mounting rail.

* * * * *